United States Patent [19]

Yagi et al.

[11] 4,161,927
[45] Jul. 24, 1979

[54] FUEL INJECTION FOR DIVIDED AUXILIARY CHAMBER OF ENGINE

[75] Inventors: Shizuo Yagi, Asaka; Isao Fujii, Hasuda; Hiroshi Kogure, Tokorozawa, all of Japan

[73] Assignee: Honda Giken Kogyo Kabushiki Kaisha, Tokyo, Japan

[21] Appl. No.: 890,513

[22] Filed: Mar. 27, 1978

[51] Int. Cl.² .................. F02B 19/18; F02B 75/02
[52] U.S. Cl. ....................... 123/75 B; 123/191 S; 123/191 SP; 123/32 SP; 123/32 ST; 123/32 L; 123/32 K
[58] Field of Search ............ 123/191 S, 191 SP, 75 B, 123/32 ST, 32 SP, 32 C, 32 K, 32 L, 32 AA

[56] References Cited

U.S. PATENT DOCUMENTS

| 3,832,984 | 9/1974 | Taguchi | 123/75 B |
|---|---|---|---|
| 4,004,563 | 1/1977 | Nakamura | 123/32 K |
| 4,076,000 | 2/1978 | Takao | 123/191 S |
| 4,098,246 | 7/1978 | Noguchi | 123/191 S |

Primary Examiner—Ronald H. Lazarus
Attorney, Agent, or Firm—Lyon & Lyon

[57] ABSTRACT

The auxiliary combustion chamber of a four-cycle stratified-charge piston engine is divided into a primary cavity and a secondary cavity. Fuel injection produces a relatively rich mixture in the primary cavity and in the secondary cavity, and the main combustion chamber receives a relatively lean mixture. A spark plug communicates with the primary cavity. A long torch passage connects the primary cavity with the central portion of the main combustion chamber, and one or more short torch passages connect the secondary cavity with a peripheral portion of the main combustion chamber. The purpose is to reduce emission of $NO_x$ without adversely affecting emissions of CO and HC, and to improve fuel economy.

4 Claims, 3 Drawing Figures

FUEL INJECTION FOR DIVIDED AUXILIARY CHAMBER OF ENGINE

This invention relates to a four-cycle stratified-charge internal combustion spark ignition engine. This invention has as its primary object to enable operation on the rich side of the lean range and to reduce the amount of $NO_x$ emissions in the exhaust and to improve the indicated specific fuel consumption (ISFC) and hence the engine power output, these improvements to take place over the entire range of operation loads on the engine, and without increasing emissions of CO and HC. When such an engine is mounted in a motor vehicle the driveability is improved.

A strong requirement for better fuel economy has long been made on the internal combustion engine; therefore, even when the exhaust emissions are reduced to the desired level, a good fuel economy should be maintained.

It is desirable to operate the engine on an overall lean air-fuel ratio because this not only results in reducing the $NO_x$ emission, but also improves the indicated specific fuel consumption (ISFC). However, it is extremely difficult with conventional engines without catalytic converters to reduce the exhaust emissions to the required level and at the same time to improve the fuel economy.

It is known, for stratified charge engines, that the overall air-fuel ratio should be leaner than stoichiometric in order to minimize generation of CO, HC and $NO_x$ emissions at the same time. However, if the engine is operated over a wide range of loads, there is a limit on how lean the overall air-fuel ratio may be set. During relatively light load operation of the engine, an excessively lean air-fuel ratio will cause increases in the generation of CO and HC. On the other hand, during relatively heavy load operation of the engine, an excessively lean air-fuel ratio will cause deterioration of driveability of a motor vehicle.

In order to reduce the $NO_x$ emission in the exhaust and at the same time improve the indicated specific fuel consumption (ISFC), the combustion process in the combustion chamber has been studied for each range of loads on an engine of the torch ignition type. It has been found from this study that the following improvements should be made regarding the formation of torch flames contributing to the combustion of lean mixture in the main combustion chamber.

The percentages of generation of CO, HC and $NO_x$ emissions from an engine vary greatly according to its load conditions: The generation of HC will be higher as the load on the engine becomes lighter, and it will be lower as the load on the engine increases, whereas the generation of $NO_x$ will be lower at light loads and will be higher at heavy loads. Consequently, in the range of light load operation of the engine, the emphasis should be placed on the reduction of the HC emission and in the range of heavy load operation of the engine the emphasis should be placed on the reduction of the $NO_x$ emission.

In order to prevent the increase of CO and HC emissions in the range of light load operations while the overall air-fuel ratio is lean, it has been suggested that a plurality of torch openings be provided to improve the combustion by multi-torch flames injection; however, this results in increase of the speed of combustion in the range of heavy load operations to increase the generation of $NO_x$ emissions. On the other hand, in the range of heavy load operations, in order to prevent the increase of $NO_x$ emission, the torch flame should be directed mainly to the center of the main combustion chamber. However, this results in an increase of CO and HC emissions in the range of light load operations.

With this relationship known between the load conditions of the engine and its exhaust emissions, it has been found that:

(1) In the range of light load operation of the engine the torch flames should be directed effectively toward the center of the main combustion chamber and in the neighborhood of the cylinder walls; and (2) In the range of heavy load operation of the engine the torch flames should be directed mainly to the center of the main combustion chamber.

During light load operation of the engine, the volumetric efficiency is low, the percentage of residual gas in the mixture in the cylinder is high, and turbulence of the mixture in the main combustion chamber is weaker as compared with that during heavy load operation of the engine, so that combustion is likely to be unstable. In order to cause more stable combustion and thereby reduce the CO and HC emissions and at the same time improve the indicated specific fuel consumption (ISFC), it is essential that a plurality of torch openings be provided and the time difference in combustion timing by multi-torch flames oriented in two directions and located in different positions be accomplished to reduce $NO_x$.

On the other hand, during heavy load operation of the engine, the volumetric efficiency is high, and turbulence of mixture in the main combustion chamber is greater as compared with turbulence during light load operation of the engine, so that in order to minimize the increase of $NO_x$ emission, it is essential that the combustion be prevented from becoming unnecessarily rapid, and this is accomplished by directing the torch flame mainly to the center of the main combustion chamber. In this way, $NO_x$ emission in the range of heavy load operation can be reduced.

The structure employed to produce the results described above requires that each auxiliary combustion chamber be divided into a primary cavity and a secondary cavity. A relatively lean air-fuel mixture is supplied to the main combustion chamber and a fuel injector supplies fuel only to form a relatively rich air-fuel mixture in the primary cavity of the auxiliary combustion chamber, and then to the secondary cavity thereof. A primary torch passage extends from the primary cavity to the main combustion chamber and has an outlet end positioned near the center of the main combustion chamber. A spark plug communicates with the primary cavity. One or more secondary torch passages extend from the secondary cavity to the main combustion chamber and each has an outlet end positioned adjacent a peripheral zone of the main combustion chamber. Accordingly, the primary object of this invention is to reduce the $NO_x$ emission in the exhaust over the entire range of loading of the engine without increasing emissions of CO and HC, while at the same time improving the indicated specific fuel consumption and hence the engine power output, thereby improving the drivability of the motor vehicle.

An engine constructed in this manner operates with reduced $NO_x$ emission even when the overall air-fuel mixture is leaner than stoichiometric, and this is accomplished without increasing the generation of CO and HC emissions.

According to a comparison between this invention and a conventional engine, this invention improves $NO_x$ emission and ISFC. Moreover, it will be understood that if the required level of $NO_x$ emission remains the same as with the conventional engine, this invention makes it possible to set the air-fuel ratio on the rich side of the lean range whereby an improvement is achieved in the driveability of the motor vehicle.

Other and more detailed objects and advantages will appear hereinafter.

Figure 1:
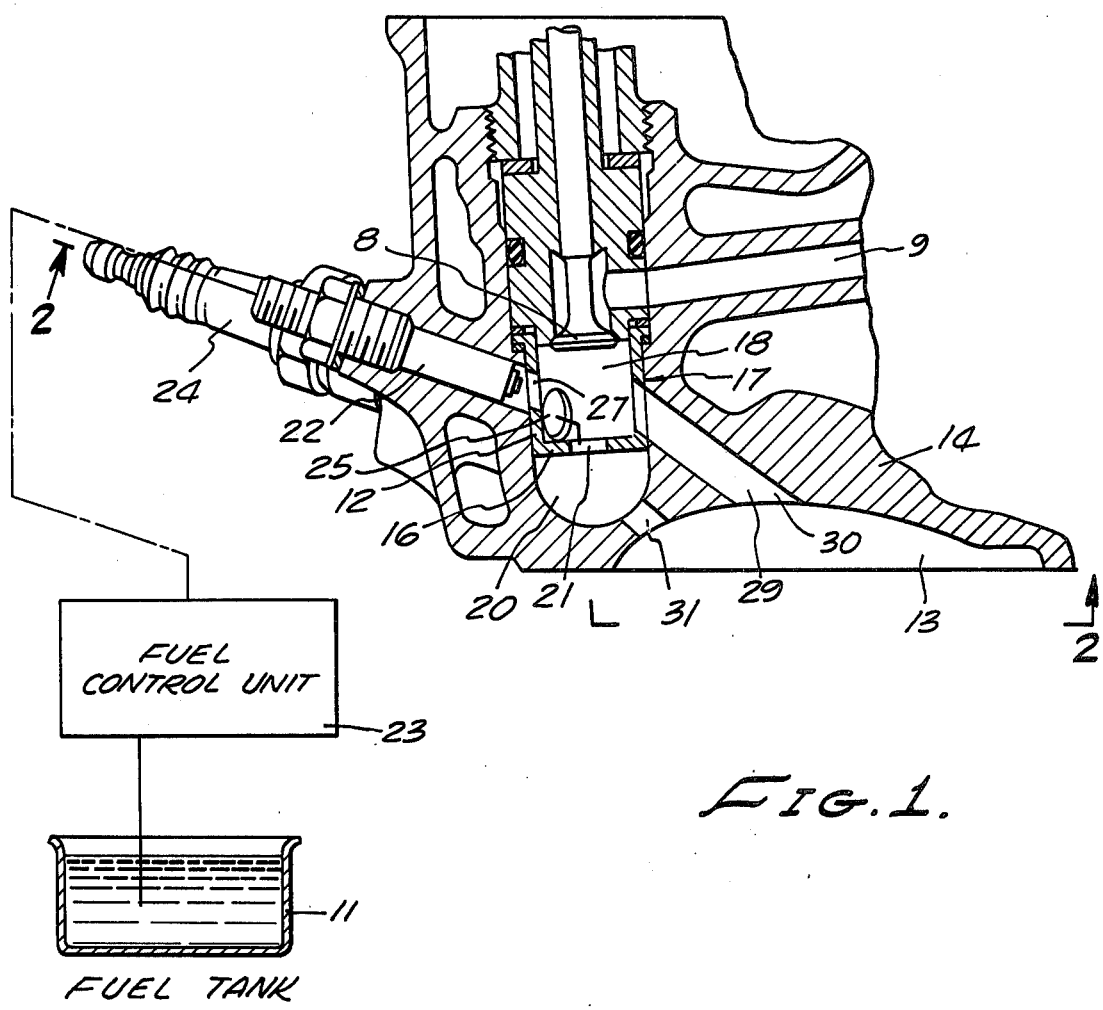
FIG. 1 is a sectional side elevation partly broken away, taken on lines 1—1 as shown on FIG. 2, and illustrating a preferred form of the present invention.
Figure 2:
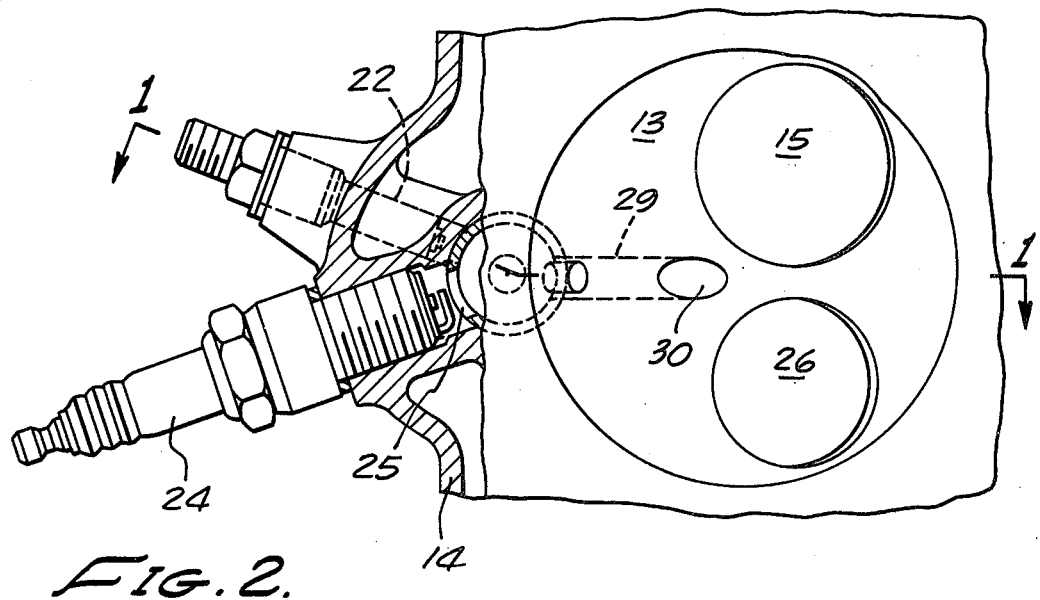
FIG. 2 is a view partly in section and partly broken away, looking up under the cylinder head in the direction of the lines 2—2 as shown on FIG. 1.

Referring to the drawings, FIGS. 1 and 2 show an engine cylinder head generally designated 14 for one or more cylinders each with a piston, not shown. The upper face of the piston forms one wall of a main combustion chamber 13, the other walls being formed in the cylinder head 14. The main intake valve 15 controls flow of relatively lean air-fuel mixture into the main combustion chamber 13. An auxiliary combustion chamber generally designated 17 is formed in the cylinder head 14 and is divided into a primary cavity 18 and a secondary cavity 20 by the bottom wall 16 of the insert cup 12. The cavities are connected by an opening 21 in the bottom wall 16. An auxiliary intake valve 8 controls flow of fresh air from the auxiliary intake passage 9 into the primary cavity 18. The amount of air introduced per cycle is less under heavy load than under light load. An intermittent-flow fuel injector nozzle 22 is operated by a conventional fuel control unit 23 receiving fuel from the tank 11. The nozzle 22 communicates with the primary cavity 18 through the opening 27 in the wall of insert cup 12. The electrodes of a spark plug 24 communicate with the primary cavity 18 through the opening 25.

An exhaust valve 26 is provided to control the flow of exhaust gases from each main combustion chamber. The main intake valve 15, auxiliary intake valve 8 and exhaust valve 26 are all operated in timed sequence by means of conventional mechanism, not shown.

A primary torch passage 29 communicates at one end with the primary cavity 18, and the other end 30 of the torch passage 29 is positioned near the center of the main combustion chamber 13. When the spark plug 24 ignites the mixture in the primary cavity 18 a torch flame is projected through the relatively long primary torch passage 29 toward the main combustion chamber 13. The ignition of the mixture in the primary cavity 18 causes a flame to pass through the opening 21 into the secondary cavity 20 and then through the relatively short secondary torch passage 31 into a peripheral part of the main combustion chamber 13.

Operation of the engine under light load. During the intake stroke of the engine a charge of relatively lean mixture is supplied through intake valve 15 into the main combustion chamber 13, and the injector nozzle 12 delivers a charge of fuel into the primary cavity 18, and the fuel passes into the secondary cavity 20 through the communicating opening 21 to form a rich mixture therein. At the same time, fresh air comes into cavities 18 and 20 through auxiliary intake passage 9 and auxiliary intake valve 8 thereby efficiently scavenging the cavities. The quantity of fresh air in the case of light load operation is set to be greater as compared with heavy load operation. As a result, both the primary cavity 18 and the secondary cavity 20 are filled with a fresh charge of rich mixture.

Next, during the following compression stroke of the engine, the lean mixture in the main combustion chamber 13 flows back through the torch passages 29 and 31 into both of the cavities 18 and 20 to dilute the mixtures therein. Accordingly, the mixtures in the two cavities 18 and 20 immediately before ignition have approximately the same air-fuel ratio and suitable for ignition. Upon ignition by the spark plug 24, torch flames are projected through the torch passages 29 and 31 into the main combustion chamber 13 to burn the relatively lean mixture therein. Combustion begins first at the outlet end of the short torch passage 31, and later at the outlet end of the longer torch passage 29.

The secondary torch flame, beginning earlier than the primary torch flame, is projected through the secondary torch passage 31 located in the neighborhood of the wall of the cylinder to burn the unburned gas in the neighborhood of the peripheral wall. The primary torch flame passing through the primary torch passage 29 is directed approximately to the center of the main combustion chamber and burns the relatively lean mixture in the main combustion chamber 13 and successively to its periphery. The dual combustion process described above promotes combustion of end gas that is not completely burned through the action of the peak pressure and peak temperature, and therefore reduces $NO_x$ emission without adversely affecting CO and HC emissions which are already controlled at low level.

Operation of the engine under heavy load. During the intake stroke of the engine, a charge of relatively lean mixture is supplied to the main combustion chamber 13, and the injector nozzle 22 delivers a charge of fuel into the primary cavity 18 to form a rich mixture. However, even though the quantity of fresh air in the auxiliary combustion chamber 17 in the case of heavy load operation is set, unlike the one in the case of light load operation, to be smaller, the primary cavity 18 is thoroughly scavenged as in the case of light load operation described above, and is filled with a fresh charge of rich mixture. However, the secondary cavity 20 is not fully scavenged because of the relatively small amount of fresh air supplied, and because the flow-resistance of the communicating opening 21 allows only a small amount of freshly charged rich mixture to remain in the cavity 20. Consequently, the percentages of fuel weights in the two cavities at the end of the intake stroke of the piston are such that the fuel weight is considerably greater in the primary cavity 18 and smaller in the secondary cavity 20.

Scavenging is almost complete in the secondary chamber at light loads, but as the load on the engine increases the scavenging efficiency in the secondary chamber decreases. This is brought about by operating and geometric factors of the torch passages 29 and 31 and the opening 21. During the subsequent compression stroke, the lean mixture in the main combustion chamber 13 flows back through the primary torch passage 29 and secondary torch passage 31, and immediately before ignition the mixture in the primary cavity 18 is suitable for ignition and the mixture in the secondary cavity 20 is approximately the same as the lean mixture in the main combustion chamber 13. That is to say, torch energies generated in the two cavities are different so that combustion timing is different and duration of torch flame projection from the primary and secondary torches is also different.

The following example is given by way of illustration and not of limitation: Consider a four cylinder four cycle engine of 1500 cc stroke volume. Assume that the volume of the primary cavity 18 is 3 cc and the volume of the secondary cavity 20 is also 3 cc. At idle speed of the engine approximately 11.4 cc per cycle of fresh air is drawn into and through the cavities and through the torch passageways 29 and 31. Because of the relative size of the passages 29 and 31 and of the communicating openings 21, about two-thirds of the total 11.4cc are drawn through the torch passage 29 and the remaining one-third through the secondary passages 31. Accordingly, at the end of the intake stroke of the piston 12, the primary cavity 18 is fully scavenged and contains only rich mixture, and the secondary cavity 20 is almost fully scavenged. When the engine is operating under heavy load, however, only 6.0 cc per cycle of fresh air is drawn into the cavities during the intake stroke of the piston 12. Two-thirds of this or about 4.0 cc moves through the primary torch passage 29, the remainder of about 2.0 cc passing through the secondary passage 31. Accordingly, scavenging of the secondary cavity 20 is incomplete.

When the mixture in the primary cavity 18 is ignited by the spark plug 24, the torch flame is projected through the primary torch passage 29 into the main combustion chamber. Also, flame passes through the opening 21 into the secondary cavity 20 and then through the secondary torch passage 31 into the main combustion chamber 13. However, since the mixture in the secondary cavity 20 is lean as compared to the mixture in the primary cavity 18, the mixture in the main combustion chamber 13 is caused to burn mainly by the torch flame from the primary torch passage 29.

As a result, the torch flame projected through the primary torch passage 29 approximately to the center of the main combustion chamber 13 causes the lean mixture therein to burn from its center toward its periphery by almost uniform propagation of the flame, resulting in efficient combustion. Consequently, a sudden rise both in the combustion pressure and temperature is prevented from occurring, whereby the generation of $NO_x$ emission is minimized and in addition the indicated specific fuel consumption is improved.

Summarizing, during heavy load operation of the engine the strength of the secondary torch flames is reduced to control the turbulence of the mixture in the main combustion chamber 13, and the mixture therein is made to burn from the center uniformly toward the periphery, whereby excessively rapid combustion is avoided and sudden rise of combustion temperature is controlled for minimizing the generation of $NO_x$ emission and improving the indicated specific fuel consumption. This invention makes it possible to set the air-fuel ratio on the rich side of the lean range, whereby engine power output is improved.

Figure 3:
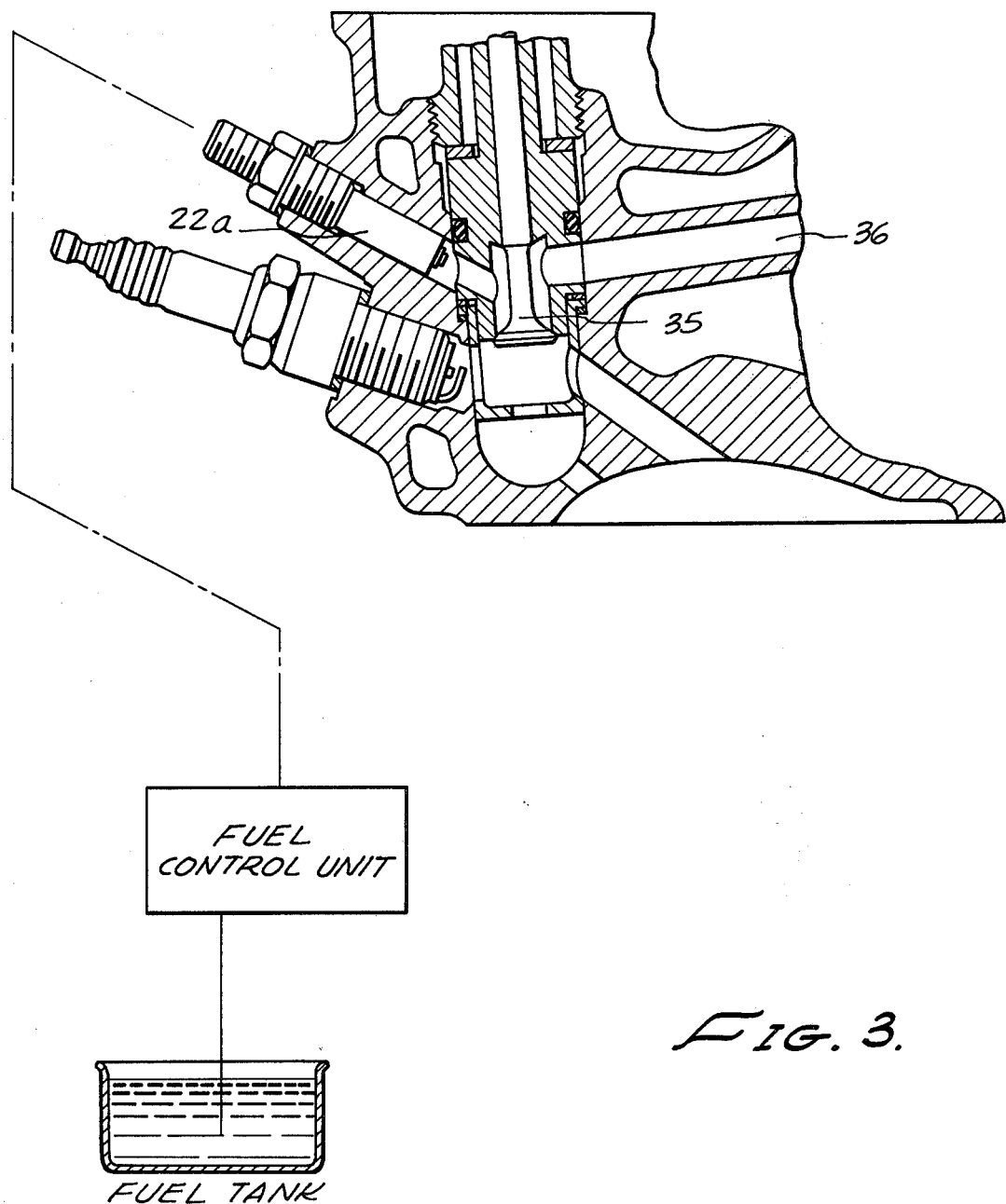
FIG. 3 is a sectional elevation similar to FIG. 1, showing a modification.

The modified form of the invention shown in FIG. 3 employs an auxiliary intake valve 35 to control the flow of air through the auxiliary intake passage 36 and the flow of fuel through the injector nozzle 22a. The injector nozzle may be of the continuous flow type or the intermittent flow type, as desired. In other respects the construction and operation of the device shown in FIG. 3 is substantially the same as that previously described.

In both forms of the invention each secondary torch passage 31 is smaller in cross section area than the cross section area of the primary torch passage 29. This construction helps to make sure that under heavy engine loading the primary torch passage is principally responsible for combustion.

Having fully described our invention, it is to be understood that we are not to be limited to the details herein set forth but that our invention is of the full scope of the appended claims.

We claim:

1. In an internal combustion piston engine having a main combustion chamber, the combination of: means forming an auxiliary combustion chamber, means dividing said auxiliary combustion chamber into a primary cavity and a secondary cavity, an opening connecting said primary and secondary cavities, spark ignition means communicating with said primary cavity, means for supplying a relatively lean air-fuel mixture to said main combustion chamber, means including a fresh air intake passage and an auxiliary intake valve for supplying fresh air to said primary cavity and into said secondary cavity, means including a fuel injector for supplying fuel during the intake stroke to mix with the fresh air to form relatively rich air-fuel mixtures in both of said cavities, a relatively long primary torch passage extending from said primary cavity to said main combustion chamber and having an outlet end positioned near the center of said main combustion chamber, and a relatively short secondary torch passage extending from said secondary cavity to said main combustion chamber and having an outlet end positioned adjacent a peripheral zone of said main combustion chamber.

2. In an internal combustion piston engine having a main combustion chamber, the combination of: means forming an auxiliary combustion chamber, means dividing said auxiliary combustion chamber into a primary cavity and a secondary cavity, an opening connecting said primary and secondary cavities, spark ignition means communicating with said primary cavity, means for supplying a relatively lean air-fuel mixture to said main combustion chamber, means including a fresh air intake passage and an auxiliary intake valve for supplying fresh air to said primary cavity and into said secondary cavity, means including an intermittent flow fuel injector for supplying fuel during the intake stroke to said primary cavity downstream from said intake valve to form relatively rich air-fuel mixtures in both cavities, a relatively long primary torch passage extending from said primary cavity to said main combustion chamber and having an outlet end positioned near the center of said main combustion chamber, and a relatively short secondary torch passage extending from said secondary cavity to said main combustion chamber and having an outlet end positioned adjacent a peripheral zone of said main combustion chamber.

3. In an internal combustion piston engine having a main combustion chamber, the combination of: means forming an auxiliary combustion chamber, means dividing said auxiliary combustion chamber into a primary cavity and a secondary cavity, an opening connecting said primary and secondary cavities, spark ignition means communicating with said primary cavity, means for supplying a relatively lean air-fuel mixture to said main combustion chamber, means including a fresh air intake passage and an auxiliary intake valve for supplying fresh air to said primary cavity and into said secondary cavity, means including a fuel injector for supplying fuel during the intake stroke upstream of said intake valve to form relatively rich air-fuel mixtures in both cavities, a relatively long primary torch passage extending from said primary cavity to said main combustion chamber and having an outlet end positioned near the center of said main combustion chamber, and a relatively short secondary torch passage extending from said secondary cavity to said main combustion chamber and having an outlet end positioned adjacent a peripheral zone of said main combustion chamber.

4. The method of operating a four-cycle internal combustion spark ignition piston engine comprising the steps of: supplying a relatively lean air-fuel mixture into a main combustion chamber during the intake stroke of the engine, supplying air to an upstream cavity and a connected downstream cavity during the intake stroke, supplying injected fuel to mix with the air to form relatively rich air-fuel mixtures in the cavities, causing flow of rich mixture from each cavity so that one portion from the upstream cavity enters the main combustion chamber near its center while another portion from the downstream cavity enters the main combustion chamber near its periphery, compressing the mixture in the main combustion chamber and both cavities, and igniting the mixtures in the upstream cavity at the end of the compression stroke of the engine.

* * * * *